United States Patent [19]

Kuwahara et al.

[11] Patent Number: 5,364,155
[45] Date of Patent: Nov. 15, 1994

[54] CAR COVER

[75] Inventors: Kiyoshi Kuwahara; Akira Yoshida; Masako Kuwahara, all of Osaka, Japan

[73] Assignee: Perfect Shoji Kabushiki Kaisha, Osaka, Japan

[21] Appl. No.: 156,636

[22] Filed: Nov. 24, 1993

[30] Foreign Application Priority Data

Nov. 30, 1992 [JP] Japan .................. 4-082410[U]

[51] Int. Cl.$^5$ .................................... B60J 11/00
[52] U.S. Cl. ............................ 296/136; 296/95.1
[58] Field of Search ............ 296/136, 95.1; 150/166; 160/370.2

[56] References Cited

U.S. PATENT DOCUMENTS

| 4,799,728 | 1/1989 | Akers et al. ................ 296/136 |
| 4,856,842 | 8/1989 | Ross et al. .................. 296/136 |
| 4,958,881 | 9/1990 | Piros .......................... 296/136 X |
| 5,022,700 | 6/1991 | Fasiska et al. .............. 296/136 X |
| 5,088,788 | 2/1992 | Moulton ...................... 296/136 |
| 5,188,417 | 2/1993 | Curchod ...................... 296/136 |
| 5,244,245 | 9/1993 | Kashino ....................... 296/136 |

FOREIGN PATENT DOCUMENTS

| 45-31207 | 12/1970 | Japan ........................ 296/136 |
| 54-23706 | 8/1979 | Japan ........................ 296/136 |
| 56-08729 | 2/1981 | Japan ........................ 296/136 |

Primary Examiner—Joseph Pape
Attorney, Agent, or Firm—Wenderoth, Lind & Ponack

[57] ABSTRACT

A car cover has a bag for storing the cover. The bag can be stably mounted on the trunk, and in this state the cover can be put on the car smoothly. A pair of triangular sheets are connected to the bag. The bag is secured to the cover member through a gusset provided between the triangular sheets. A belt connected to the free ends of the triangular sheets is put around the hinges in the trunk room. A mounting sheet is stitched to the edge of the opening of the bag and is fastened to the interior surface of the trunk by hook-and-loop fasteners provided near its front edge. After supporting the bag on the rear wall of the trunk by fastening the triangular sheets and the mounting sheet, the trunk door is closed and the cover member is taken out of the bag and put on the car. The locking mechanism of the trunk door can pass through a gap between the triangular sheets or a hole formed in the mounting sheet, so that the trunk door can be closed and locked.

8 Claims, 6 Drawing Sheets

CAR COVER

BACKGROUND OF THE INVENTION

This invention relates to a car cover with a bag for storing the cover.

A cover with a bag is disclosed in Japanese Examined Utility Model Publication 54-23706. This car cover is used to cover a car entirely and has a storage bag attached to its backside. Belts are secured to the cover at both ends of a line along which the bag is connected to the cover. The free ends of the belts are tied to the hinges of the trunk door. In this state, the bag is taken out of the trunk room (as shown in FIG. 11) and the trunk is closed. Then the cover is pulled out of the bag and put on the car.

In this prior art, the bag is stitched along its opening edge directly to the cover. On the other hand, the bag is held in a fixed position when the trunk is closed. Thus, when putting the cover on the car, its portion connected to the bag cannot be moved freely. This will hamper smooth covering work. Also, the cover can be torn easily at the portion where the bag is stitched, because large forces tend to act on this portion.

The bag is connected to the trunk by means of narrow belts, which are secured to the bag by simple stitching. Thus, the belts may be torn from the cover along the stitch lines if strong external forces such as wind act on the stitch lines while the cover is put on the car. Further, it is difficult to hold the bag stably in this state, because the stitch lines are very narrow.

An object of this invention is to provide a car cover with a storage bag which can be easily put on a car, which makes it possible to stably support the bag, and which is less likely to be damaged at the portion where the bag is secured.

SUMMARY OF THE INVENTION

In order to solve the above problems, in a first arrangement of the present invention, there is provided a car cover comprising a cover member for covering a car and a bag for storing the cover member, the bag being secured to the back of the cover member through a gusset and having means for fastening the bag to the trunk room of a car.

From another aspect of the invention, two triangular sheet members having bottom edges may be secured to an opening edge of the bag so as to be spaced apart a predetermined distance from each other, the fastening means being secured to free ends of the triangular sheet members for connecting the bag to a trunk room of a car.

From still another aspect of the invention, a mounting sheet member may be secured to the opening edge of the bag, the mounting sheet member having two fastening means on both sides thereof near its front edge for fastening the bag to the inner wall of a trunk room of a car, the mounting sheet being formed with a hole in its intermediate portion through which a locking member of a trunk door can be inserted.

The fastening means may be belts, hook-and-loop fasteners, snap fasteners, hook-and-eye fasteners or any other known fasteners.

The length of the gusset is determined through experiments so that the cover member can be moved about smoothly when putting it on the car.

The sizes of the triangular sheet members and the mounting sheet member are determined taking into account how strongly they are to be secured to the storage bag.

In the use of the car cover of this invention, after fixing the free ends of the triangular sheets or the front edge of the mounting sheet to the inside of the trunk room, the bag is brought out of the trunk and the trunk is closed with the bag held against the rear wall of the trunk. Since the locking mechanism of the trunk door can pass between the triangular sheets or through the hole formed in the mounting sheet, the door can be closed and locked in this state.

In a second arrangement, the tensile force applied to the tip of each triangular sheet member is dispersed toward its base and is distributed uniformly over the entire length of the base. This force serves to press a large area of the bag against the rear wall of the trunk. Thus, the bag can be stably supported thereon.

In a third arrangement, by closing the door, the locking mechanism is inserted into the hole in the mounting sheet, thus preventing the mounting sheet from slipping out. The mounting sheet is sufficiently wide, so that the bag is pressed over a large area against the rear wall of the trunk. Thus, the bag can be stably supported thereon.

In this state, after closing the trunk, the cover member is taken out of the bag and put on the car. In the first arrangement, the bag scarcely hinders the movement of the cover member when putting the latter on the car. Namely, the gusset serves as a buffer between the bag and the cover member.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
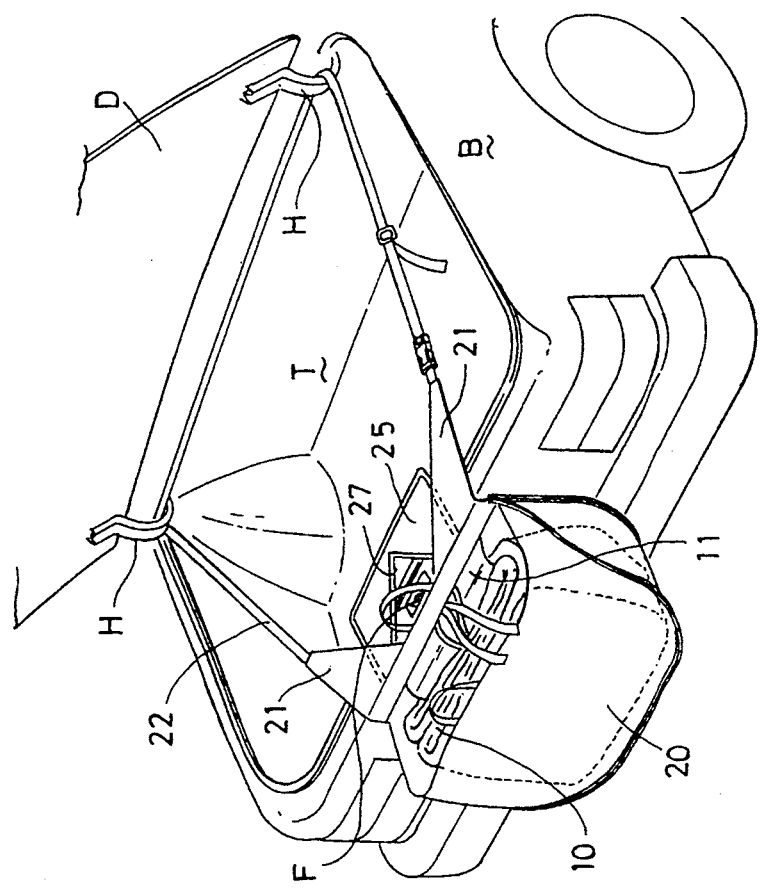
FIG. 1 is a view of one embodiment showing how it is used.
Figure 2:
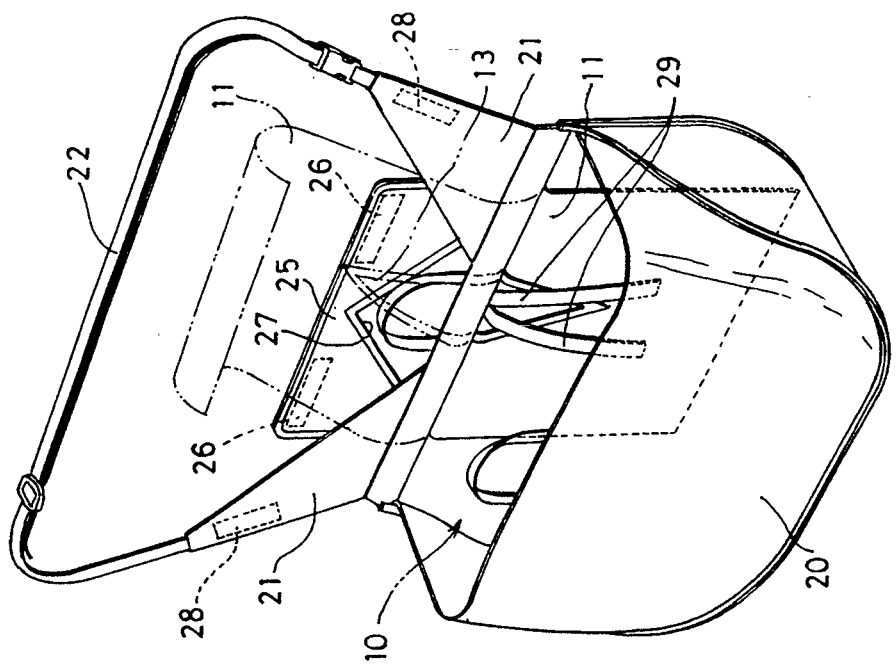
FIG. 2 is an enlarged perspective view of a portion of the first embodiment.

The car cover shown in FIGS. 1 and 2 comprises a cover member 10 and a storage bag 20. Both members are sheets of a weatherproof synthetic resin, as with conventional car covers. The storage bag 20 should be so spacious that the cover member 10 can be easily put therein, even if it is folded rather roughly.

Figure 9:
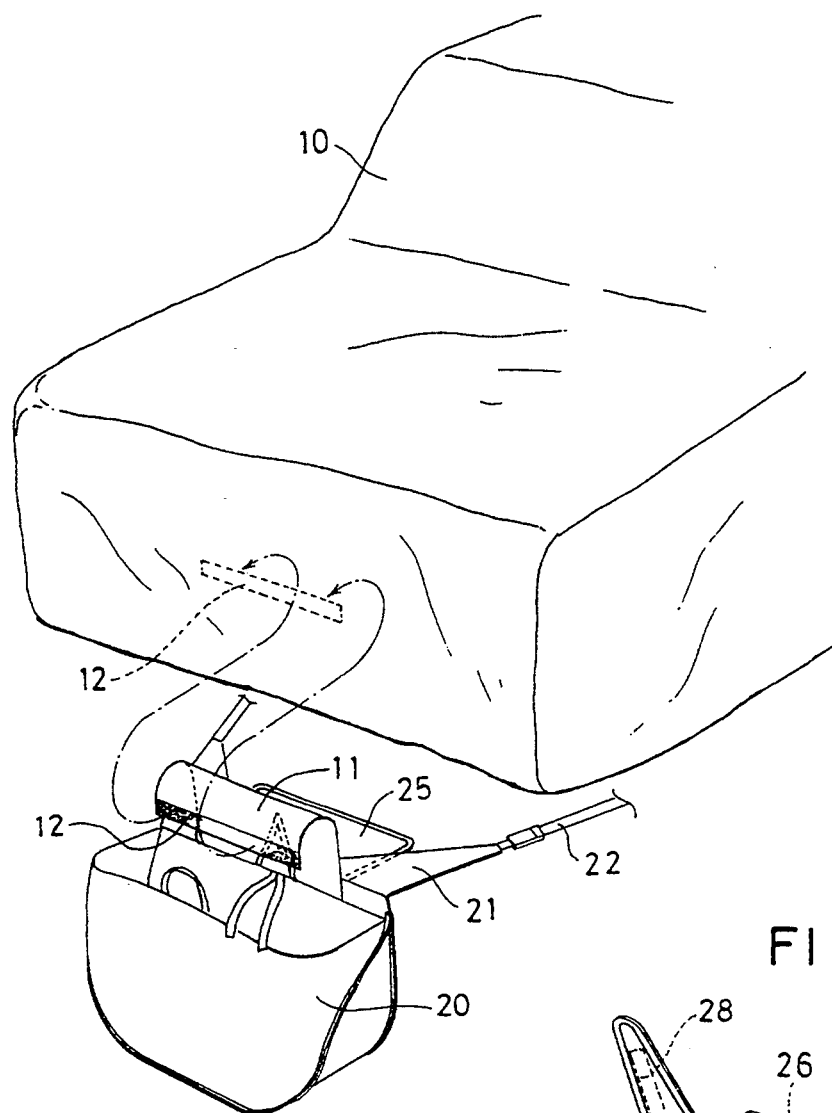
FIG. 9 is an enlarged perspective view of a portion of another embodiment.
Figure 10:
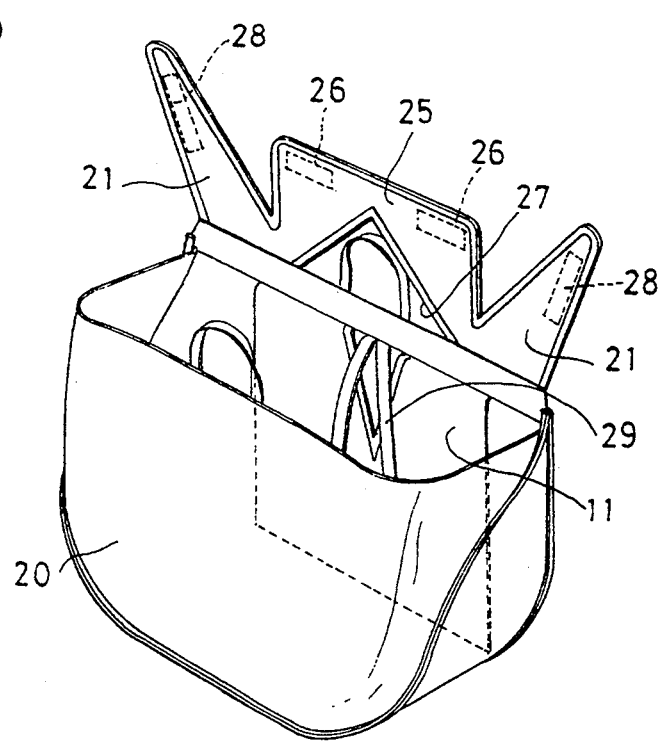
FIG. 10 is a perspective view of another embodiment.
Figure 11:
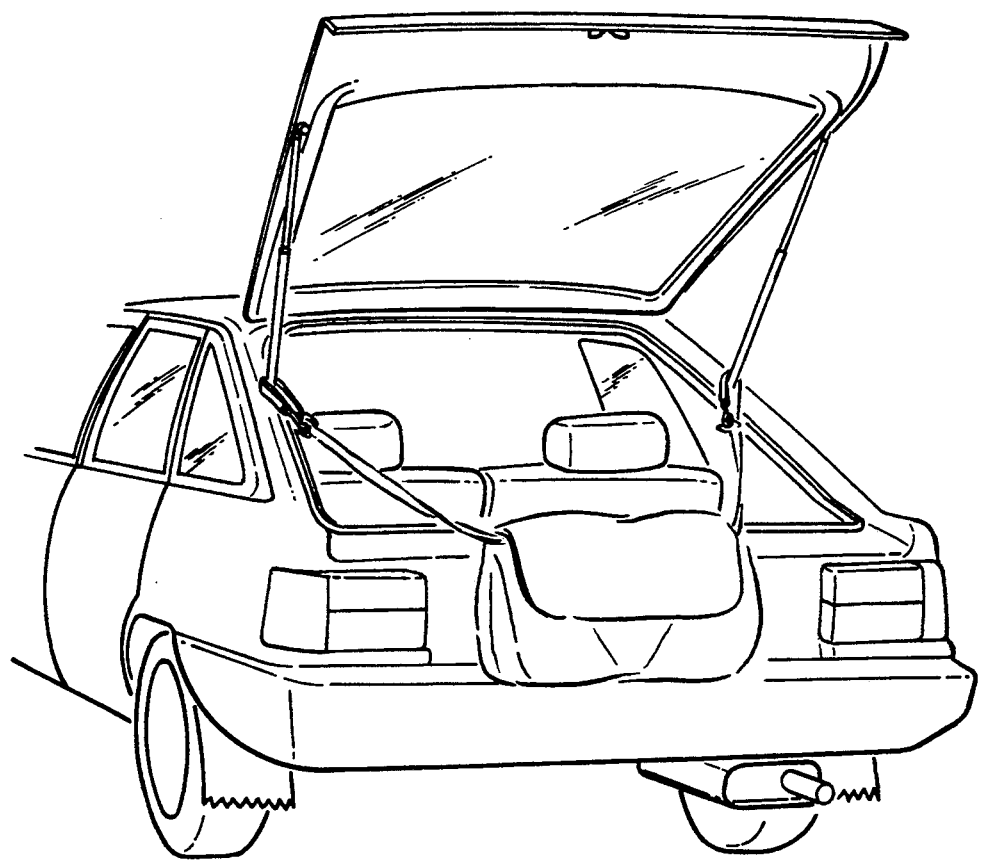
FIG. 11 is a perspective view showing a prior art car cover.

The storage bag 20 is connected to the cover member 10 through a gusset 11. These three members 10, 11 and 20 are ordinarily connected together by stitching, but may be connected together by welding or by means of hook-and-loop fasteners 12 as shown in FIG. 9. By using this type of fasteners 12, the storage bag 20 can be easily detached from the cover member 10.

To the opening edge of the storage bag 20 are secured the gusset 11, a mounting sheet 25, and bottom edges of triangular sheets 21 that are spaced apart a predetermined distance from each other. To the tip of each triangular sheet 21 is fastened the end of a belt 22. As shown in FIG. 1, the belt 22 is put around the hinges H of the trunk door D. The bag 20 is thus fastened and held stably in position on the rear wall of the trunk T.

Figure 4:
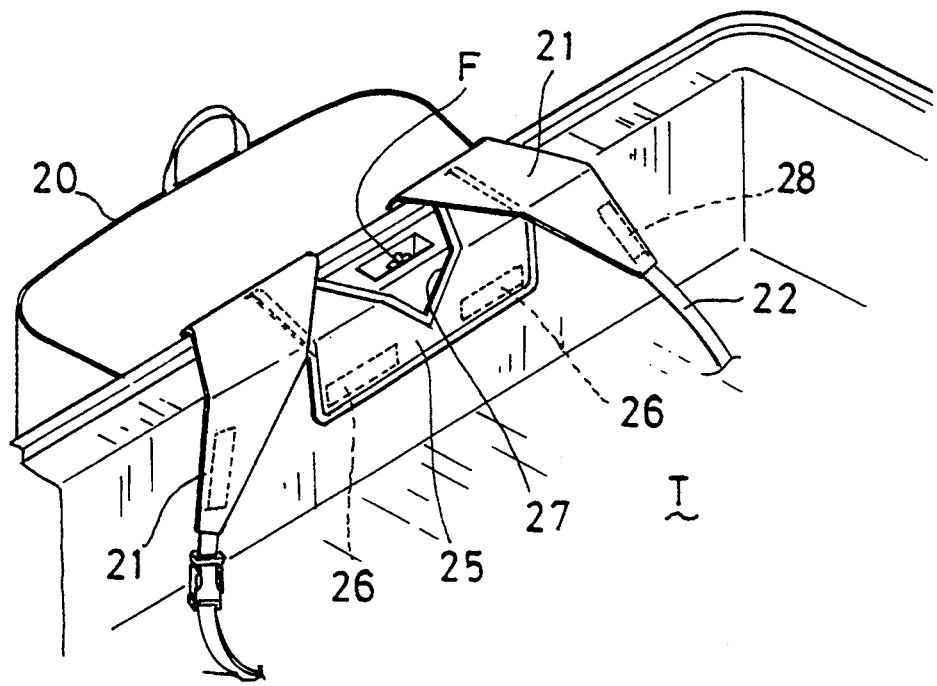
FIG. 4 is another view of the first embodiment showing how it is used.

The mounting sheet 25 is secured to the interior surface of the trunk T through hook-and-loop fasteners 26 as shown in FIG. 4. If the fasteners 26 cannot be fastened to the interior surface of the trunk, fasteners engageable with the fasteners 26 may be fixed thereto. The mounting sheet 25 may also be secured in position through a belt. A hole 27 is formed in the center of the mounting sheet 25. The sheet 25 is positioned so that the locking mechanism F of the trunk door D is engageable through the hole 27. Thus, the trunk door can be closed and locked in this state. Also, by closing the door D, the locking mechanism F prevents the mounting sheet 25 from slipping out.

Either the triangular sheets 21 or the mounting sheet 25 may be omitted if it is possible to stably hold the bag 20 in position.

Figure 3:
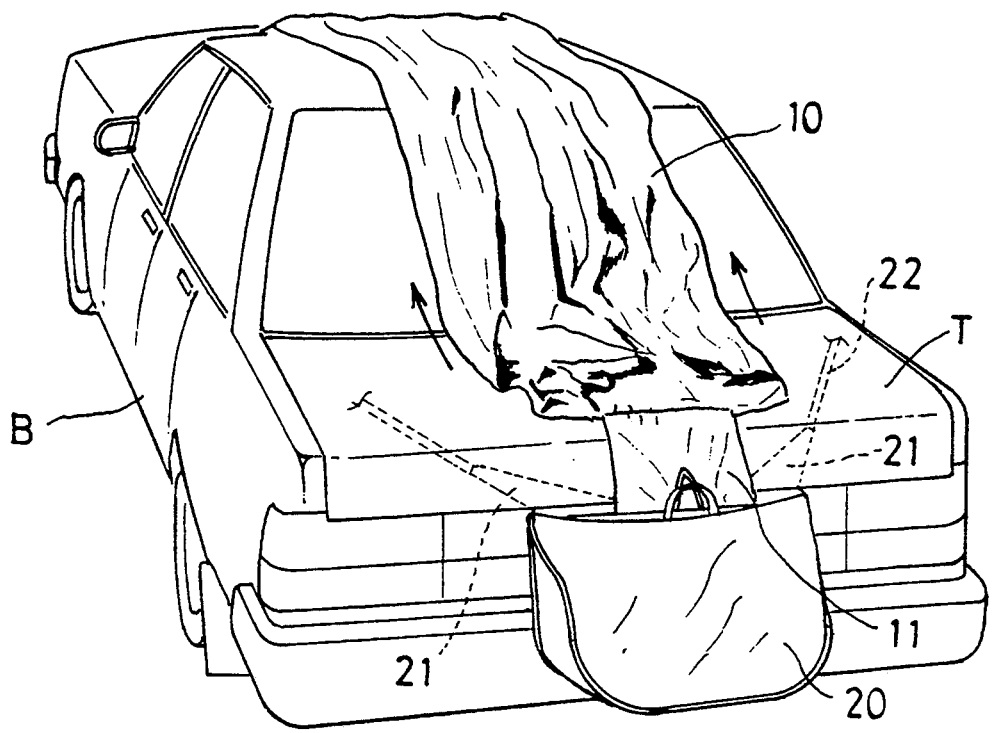
FIG. 3 is a view of the first embodiment showing how it is used.
Figure 5:
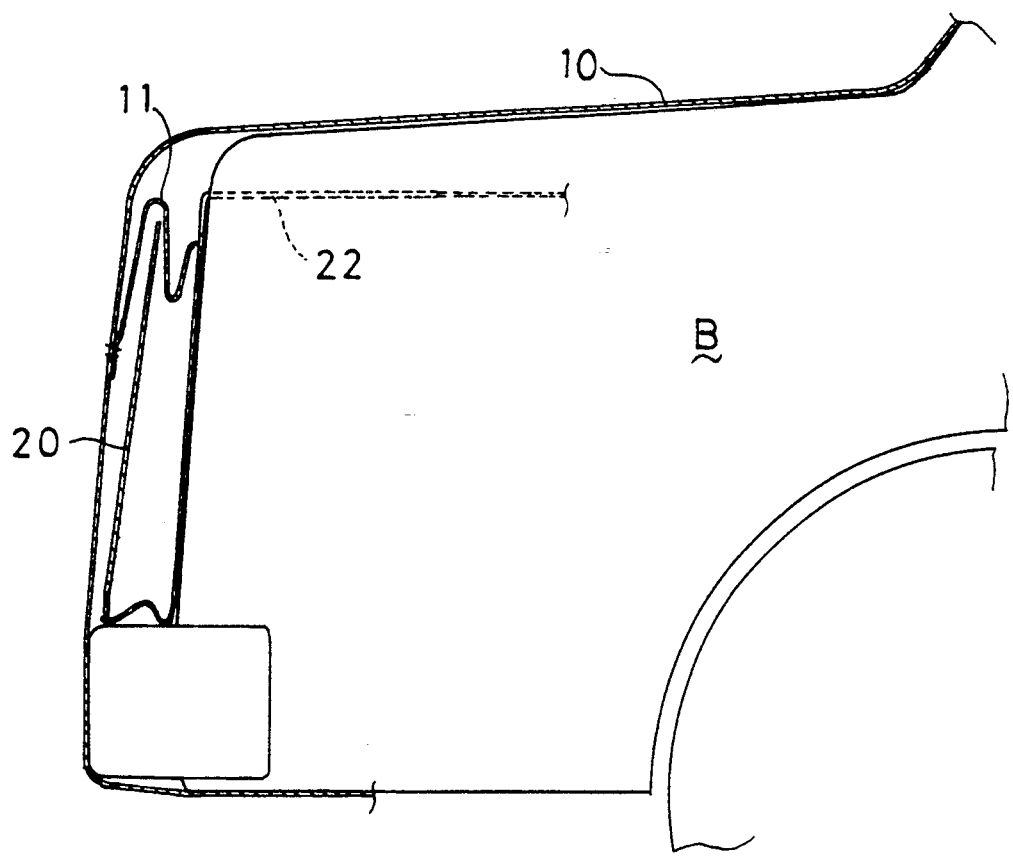
FIG. 5 is another view of the first embodiment showing how it is used.

Now we will describe how the car cover of this embodiment is used. As shown in FIGS. 1 and 4, the triangular sheets 21 and the mounting sheet 25 are connected through the belt 22 and the fasteners 26, respectively, to the interior of the trunk T, with the storage bag 20 held against the rear surface of the trunk T. Then, as shown in FIG. 3, the cover member 10 is taken out of the bag 20 and put on the car in the same manner as with a conventional car cover. In this state, the bag 20 is hidden inside the cover member 10 as shown in FIG. 5.

Figure 6:
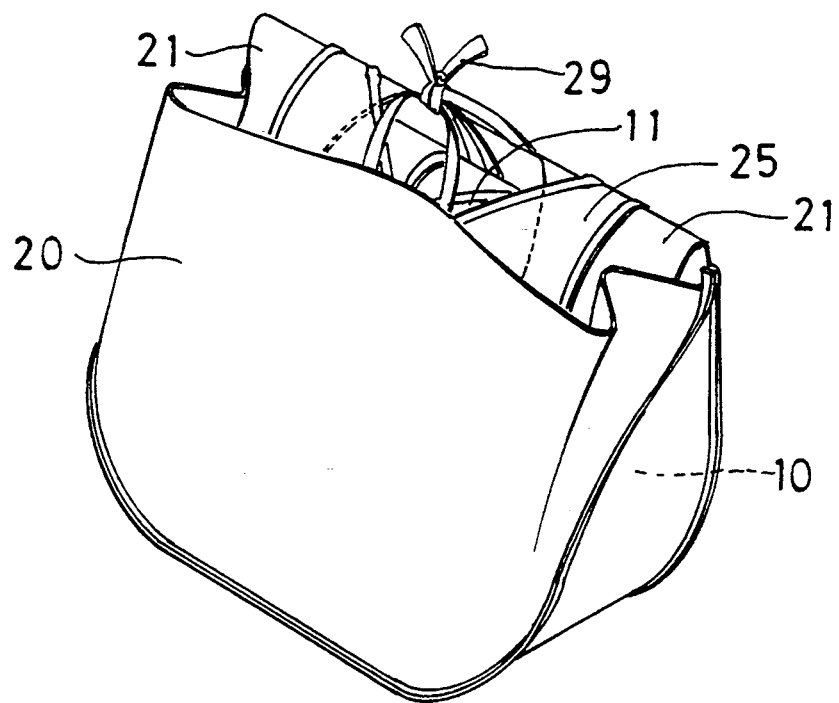
FIG. 6 is a view of the first embodiment showing how the cover member is put in the bag.

In order to put the cover member 10 into the storage bag 20, it is removed from the car and folded and put in the bag 20 as shown in FIG. 1. The bag 20 is then simply put in the trunk T. The belt 22 may be detached from the hinges 20. Otherwise, as shown in FIG. 6, the bag may be put in the trunk T after tying hand straps of the bag with a rope 29. Also, the car cover may be put on sale in this state so that a purchaser can carry it easily.

Figure 7:
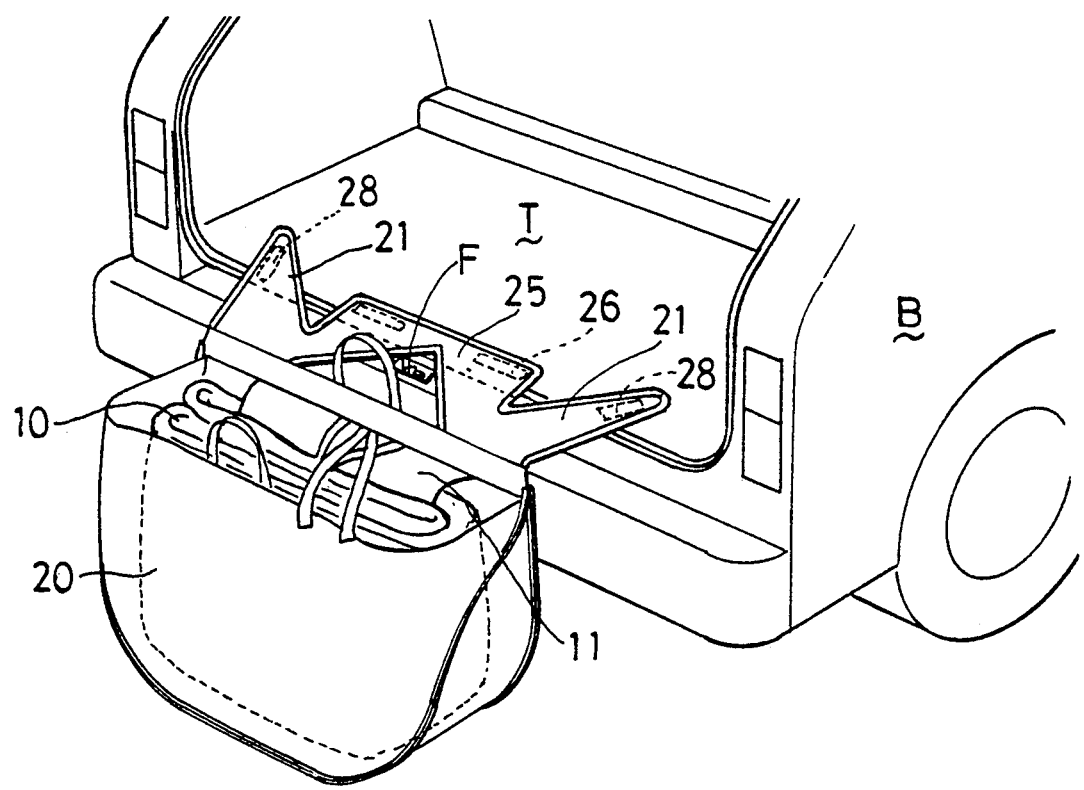
FIG. 7 is a view of a second embodiment showing how it is used.

As shown in FIG. 7, when the car cover is used for a car whose trunk T has no rear wall, hook-and-loop fasteners 28 may be provided on the triangular sheets 21 to fasten both the sheet 25 and the sheets 21 to the inner wall of the trunk through hook-and-loop fasteners, with the bag held against the bumper. Otherwise, the sheets may be fixed in position using the belt 22. In this case, the belt 22 is put around the lower part of the backrest of the rear seat. Further, the triangular sheets 21 may be fixed in position using both the belt 22 and the fasteners 28.

Figure 8:
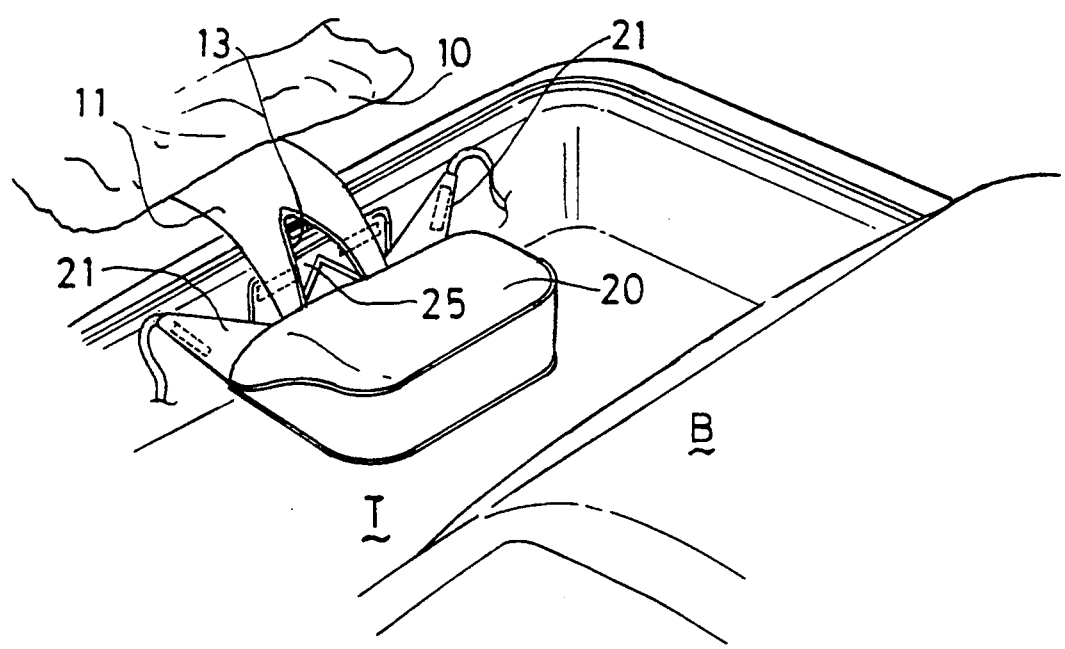
FIG. 8 is a view showing still another embodiment.

As shown in FIG. 8, the cover member 10 may be taken out of the bag 20 with the latter left in the trunk T. In this case, it is necessary to provide the gusset 11 with a hole 13 through which the locking device F is inserted.

What is claimed is:

1. A car cover, comprising:
    a cover member having a back side;
    a bag for storing said cover member, said bag having an opening edge and a gusset securing said bag to said back side of said cover member;
    two triangular sheet members having bottom edges and free ends, said bottom edges being secured to said opening edge of said bag such that said triangular sheet members are spaced apart a predetermined distance from each other; and
    a fastening arrangement for fastening said bag to the trunk room of a car, said fastening arrangement being secured to said free ends of said triangular sheet members.

2. The car cover of claim 1, wherein said fastening arrangement is a belt.

3. The car cover of claim 1, wherein said fastening arrangement comprises hook-and-loop fasteners.

4. The car cover of claim 1, and further comprising a mounting sheet member secured to said opening edge of said bag having a front edge, an intermediate portion, a hole in said intermediate portion for receiving a trunk door locking member therethrough, and two fasteners on sides of said mounting sheet member adjacent to said front edge for fastening said bag to the inner wall of a trunk room of a car.

5. A car cover comprising:
    a cover member having a back side;
    a bag for storing said cover member, said bag having an opening edge and a gusset securing said bag to said back side of said cover member;
    a fastening arrangement for fastening said bag to the trunk room of a car; and
    a mounting sheet member secured to said opening edge of said bag and having a front edge, an intermediate portion, a hole in said intermediate portion for receiving a trunk door locking member therethrough, and two fasteners on sides of said mounting sheet member adjacent to said front edge for fastening said bag to the inner wall of a trunk room of a car.

6. The car cover of claim 5, wherein said fastening arrangement is a belt.

7. The car cover of claim 5, wherein said fastening arrangement comprises hook-and-loop fasteners.

8. The car cover of claim 5, wherein said fasteners of said mounting sheet member are hook-and-loop fasteners.

* * * * *